(12) United States Patent
Cheon

(10) Patent No.: US 7,672,451 B2
(45) Date of Patent: Mar. 2, 2010

(54) SMALL SIZED HINGE DEVICE FOR USE IN ELECTRONIC HANDHELD DEVICE

(75) Inventor: In Ki Cheon, Seoul (KR)

(73) Assignee: Amphenol Phoenix Co., Ltd. (KR)

( * ) Notice: Subject to any disclaimer, the term of this patent is extended or adjusted under 35 U.S.C. 154(b) by 68 days.

(21) Appl. No.: 12/175,765

(22) Filed: Jul. 18, 2008

(65) Prior Publication Data

US 2009/0019668 A1 Jan. 22, 2009

Related U.S. Application Data

(63) Continuation of application No. PCT/KR2007/000274, filed on Jan. 17, 2007.

(30) Foreign Application Priority Data

Jan. 18, 2006 (KR) .................... 10-2006-0005322

(51) Int. Cl.
*H04M 1/00* (2006.01)
*H04M 9/00* (2006.01)
(52) U.S. Cl. ................ 379/433.13; 455/575.3
(58) Field of Classification Search ............ 379/433.01, 379/433.11, 433.13; 455/575.1, 575.3; 16/297, 16/330
See application file for complete search history.

(56) References Cited

U.S. PATENT DOCUMENTS 6,115,886 A 9/2000 Fujita

FOREIGN PATENT DOCUMENTS

| KR | 10-2003-0094474 A | 12/2003 |
| KR | 20-0342536 Y1 | 2/2004 |
| KR | 10-2005-0074069 A | 7/2005 |
| KR | 20-0399015 Y1 | 10/2005 |

OTHER PUBLICATIONS

Office Action dated Dec. 6, 2006 of corresponding Korean Patent Application 10-2006-0005322—2 pages.
International Search Report dated May 18, 2007 of PCT Application No. PCT/KR2007/000274—2 pages.

*Primary Examiner*—Tuan D Nguyen
(74) *Attorney, Agent, or Firm*—Knobbe Martens Olson & Bear LLP

(57) ABSTRACT

Disclosed is an electronic handheld device. The device has a first panel, a second panel rotatable relative to the first panel about an axis and a hinge. The hinge has first and second hinge members. The first member is engaged with the first panel. The second member is engaged with the second panel and rotatable relative to the first member about the axis. The first panel has a hole generally extending along the axis. The first hinge member is configured to linearly move within the hole. The first hinge member has an outer wall that has a curved surface and a key. The curved surface is a circular arc having a radius from the axis when viewed along the axis. The key is located outside an imaginary circle, a portion of the circumference line of which overlaps the circular arc.

21 Claims, 7 Drawing Sheets

(a)

(b)

(a)

(b)

(a)

(b)

SMALL SIZED HINGE DEVICE FOR USE IN ELECTRONIC HANDHELD DEVICE

CROSS-REFERENCE TO RELATED PATENT APPLICATIONS

This application is a continuation application under 35 U.S.C. § 365(c) of International Application No. PCT/KR2007/000274, filed Jan. 17, 2007 designating the United States. International Application No. PCT/KR2007/000274 was published in English as WO2007/083916 A1 on Jul. 26, 2007. This application further claims the benefit of the earlier filing date under 35 U.S.C. § 365(b) of Korean Patent Application No. 10-2006-0005322 filed Jan. 18, 2006. This application incorporates herein by reference the International Application No. PCT/KR2007/000274 including the International Publication No. WO2007/083916 A1 and the Korean Patent Application No. 10-2006-0005322 in their entirety.

BACKGROUND

1. Field

The present disclosure relates to a hinge device, and more particularly, to a hinge device for rotatably connecting two panels of in an electronic handheld device, such as a radio telephone, a personal digital assistant (PDA), a portable computer or the like.

2. Discussion of Background Technology

A portable apparatus such as a folding-type radio telephone includes two case units coupled to each other by means of a hinge device. In general, one case unit is provided with a keypad, and the other case unit is provided with a liquid crystal display. When the telephone is in use, the keypad and the liquid crystal display are unfolded so that they can be exposed to the outside. The hinge device allows the two case units to be coupled to each other and to be smoothly folded or unfolded with respect to each other.

A related art hinge device is constructed as follows. The hinge device comprises a rotating member, a linearly moving member, an elastic member, and a housing member. The housing member contains the rotating member, the linearly moving member and the elastic member. The linearly moving member and the rotating member are generally provided with a cam surface and a cam follower, respectively, which interact with each other. The rotating member can rotate about a rotational axis within the housing member, and a portion of the rotating member protrudes outward from the housing member to form a coupling portion. The elastic member applies a force such that the linearly moving member and the rotating member can be brought into close contact with each other within the housing member. The linearly moving member, which is not rotating within the housing member, comes into contact with the rotating member but moves linearly along the rotational axis of the housing member. As a folding-type portable apparatus such as a radio telephone becomes slimmer, the hinge device for connecting the two case units is requested to be compact.

The discussion in the foregoing background section is to provide general background information, and does not constitute an admission of prior art.

SUMMARY

One aspect of the invention provides an electronic handheld device. The device comprises: a first panel; a second panel rotatable relative to the first panel about an axis such that the first and second panels are folded or unfolded with respect to each other; a hinge housing engaged with the first panel; a first hinge member received in the hinge housing and linearly movable relative to the hinge housing along the axis; a second hinge member engaged with the second panel and rotatable relative to the first hinge member about the axis, wherein one of the first and second hinge members comprises a cam having a cam surface, wherein the other comprises a cam follower in contact with the cam surface and configured to move along a path on the cam surface; and a resilient member configured to keep the cam follower and the cam surface in contact with each other, wherein the hinge housing comprises an inner wall defining a hole generally extending along the axis, wherein the first hinge member is configured to linearly move within the hole, wherein the inner wall comprises a curved surface and a key, wherein at least part of the curved surface is a circular arc having a first radius from the axis when viewed along the axis, wherein the key is configured to hinder the first hinge member from rotating relative to the hinge housing, wherein the key is located outside an imaginary circle, wherein a portion of the circumference line of the imaginary circle overlaps the circular arc.

In the foregoing device, the key may comprise a first surface and a second surface substantially parallel to the first surface. The key may comprise a first surface and a second surface substantially non-parallel to the first surface. The key may comprise a first surface and a second surface substantially perpendicular to the first surface. The key may comprise a first surface and a second surface, wherein the curved surface may interconnect the first and second surfaces without a substantially intervening surface between the curved surface and each of the first and second surfaces. The key may comprise a key surface that is substantially flat. The key may comprise a key surface extending along a tangential line of the imaginary circle when viewed along the axis.

Still in the foregoing device, the first hinge member may comprise a curved outer surface having a second radius from the axis that is sized such that the first hinge member slidably fits into the hole. The first hinge member may comprise a curved outer surface having a second radius from the axis, wherein the second hinge member may comprise a curved outer surface having a third radius from the axis that is substantially same with the second radius. The electronic handheld device may comprise one selected from the group consisting of a mobile phone, a text messaging device, a wireless data communication device, a PDA, a GPS navigator, an electronic game device and a handheld computer. The electronic handheld device may comprise a display and a keypad, wherein the first panel may comprise one of the display and the keypad, wherein the second panel may comprise the other of the display and the keypad.

Another aspect of the invention comprises an electronic handheld device. The device comprise: a first panel; a second panel rotatable relative to the first panel about an axis such that the first and second panels are folded or unfolded with respect to each other; a first hinge member engaged with the first panel and linearly movable relative to the first panel along the axis; a second hinge member engaged with the second panel and rotatable relative to the first hinge member about the axis, wherein one of the first and second hinge members comprises a cam having a cam surface, wherein the other comprises a cam follower in contact with the cam surface and configured to move along a path on the cam surface; and a resilient member configured to keep the cam follower and the cam surface in contact with each other, wherein the first panel comprises an inner wall defining a hole generally extending along the axis, wherein the first hinge member is configured to linearly move within the hole, wherein the inner wall comprises a curved surface and a key, wherein at least part of the curved surface is a circular arc having a first radius from the axis when viewed along the axis, wherein the key is configured to hinder the first hinge member from rotating relative to the hinge housing, wherein the key is located outside an imaginary circle, wherein a portion of the circumference line of the imaginary circle overlaps the circular arc. The first panel may comprise a main body and a hinge housing engaged with the main body, wherein the hinge housing may comprise the inner wall.

Still another aspect of the invention provides an electronic handheld device. The device comprise: a first panel; a second panel rotatable relative to the first panel about an axis such that the first and second panels are folded or unfolded with respect to each other; a first hinge member engaged with the first panel and linearly movable relative to the first panel along the axis; a second hinge member engaged with the second panel and rotatable relative to the first hinge member about the axis, wherein one of the first and second hinge members comprises a cam having a cam surface, wherein the other comprises a cam follower in contact with the cam surface and configured to move along a path on the cam surface; and a resilient member configured to keep the cam follower and the cam surface in contact with each other, wherein the first panel comprises a hole generally extending along the axis, wherein the first hinge member is configured to linearly move within the hole, wherein the first hinge member comprises an outer wall which comprises a curved surface and a key, wherein at least part of the curved surface is a circular arc having a second radius from the axis when viewed along the axis, wherein the key is configured to hinder the first hinge member from rotating relative to the hinge housing, wherein the key is located outside an imaginary circle, wherein a portion of the circumference line of the imaginary circle overlaps the circular arc.

In the foregoing device, the key may comprise a first surface and a second surface substantially parallel to the first surface. The key may comprise a first surface and a second surface substantially perpendicular to the first surface. The key may comprise a key surface that is substantially flat. The key may comprise a key surface extending along a tangential line of the imaginary circle when viewed along the axis. The first panel may comprise a main body and a hinge housing engaged with the main body and defining the hole. The first panel may comprise an inner wall defining the hole, wherein the inner wall may comprise an inner curved surface having a first radius from the axis which is sized such that the first hinge member slidably fits into the hole. The second hinge member may comprise a curved outer surface having a third radius from the axis that is substantially same with the second radius.

An aspect of the present invention provides a hinge device for connecting two units, which is optimally configured to ensure a compact design and smooth operation of a radio telephone.

According to an aspect of the present invention, there is provided a hinge device for connecting first and second units which can be relatively rotated about a rotational axis and folded or unfolded with respect to each other. The hinge device comprises a first connecting member connected with the first unit to be rotated together with the first unit and to be linearly moved along the rotational axis; a second connecting member connected with the second unit to be rotated together with the second unit; an elastic member for pushing the first connecting member toward the second connecting member to bring the first and second members into contact with each other; and a coupling member for coupling the first and second connecting members and the elastic member with one another, wherein one of the first and second connecting members includes a cam surface and the other includes a cam follower interacting with the cam surface; and the first connecting member includes an outer wall surface which has a circular-arc curved portion extending 180 degrees or more in a circumferential direction about the rotational axis, and first and second flat portions extending from both circumferential ends of the curved portion, respectively.

The first and second flat portions of the outer wall surface of the first connecting member may extend substantially in tangential directions from the both circumferential ends of the curved portion, respectively.

The outer wall surface of the first connecting member may further include a connection portion for connecting the first and second flat portions.

The connection portion of the outer wall surface of the first connecting member may be a third flat portion for connecting with the first and second flat portions.

The curved portion of the outer wall surface of the first connecting member may extend approximately 180 degrees in the circumferential direction about the rotational axis, and extension lengths of the first and second flat portions from the both circumferential ends of the curved portion may be substantially equal to each other.

The extension length of the first or second flat portion from the circumferential end of the curved portion of the outer wall surface of the first connecting member may be substantially equal to a distance from the rotational axis to the curved portion.

The connection portion of the outer wall surface of the first connecting member may further include a protrusion surface protruding in a radial direction from the rotational axis.

The curved portion of the outer wall surface of the first connecting member may extend greater than 180 degrees in the circumferential direction about the rotational axis and connect with the first and second flat portions of the outer wall surface of the first connecting member.

The curved portion of the outer wall surface of the first connecting member may extend approximately 270 degrees in the circumferential direction about the rotational axis.

An outer wall surface of the second connecting member may have a shape that is substantially the same as that of the outer wall surface of the first connecting member.

The hinge device may further comprise a housing member rotated together with the first unit and containing the first connecting member therein, wherein the housing member includes an end wall and a side wall extending from the end wall in a direction of the rotational axis.

The side wall of the housing member may have the shape that is substantially the same as that of the outer wall surface of the first connecting member.

Since the hinge device has a cam surface with an area great enough to implement smooth operation of the hinge device as well as a minimum shape for implementing linear movement of the hinge device, it is possible to manufacture a more compact and slim folding-type radio telephone which can be smoothly operated.

DETAILED DESCRIPTION OF EMBODIMENTS

Hereinafter, various embodiments of the present invention will be described in detail with reference to the accompanying drawings.

Figure 1:
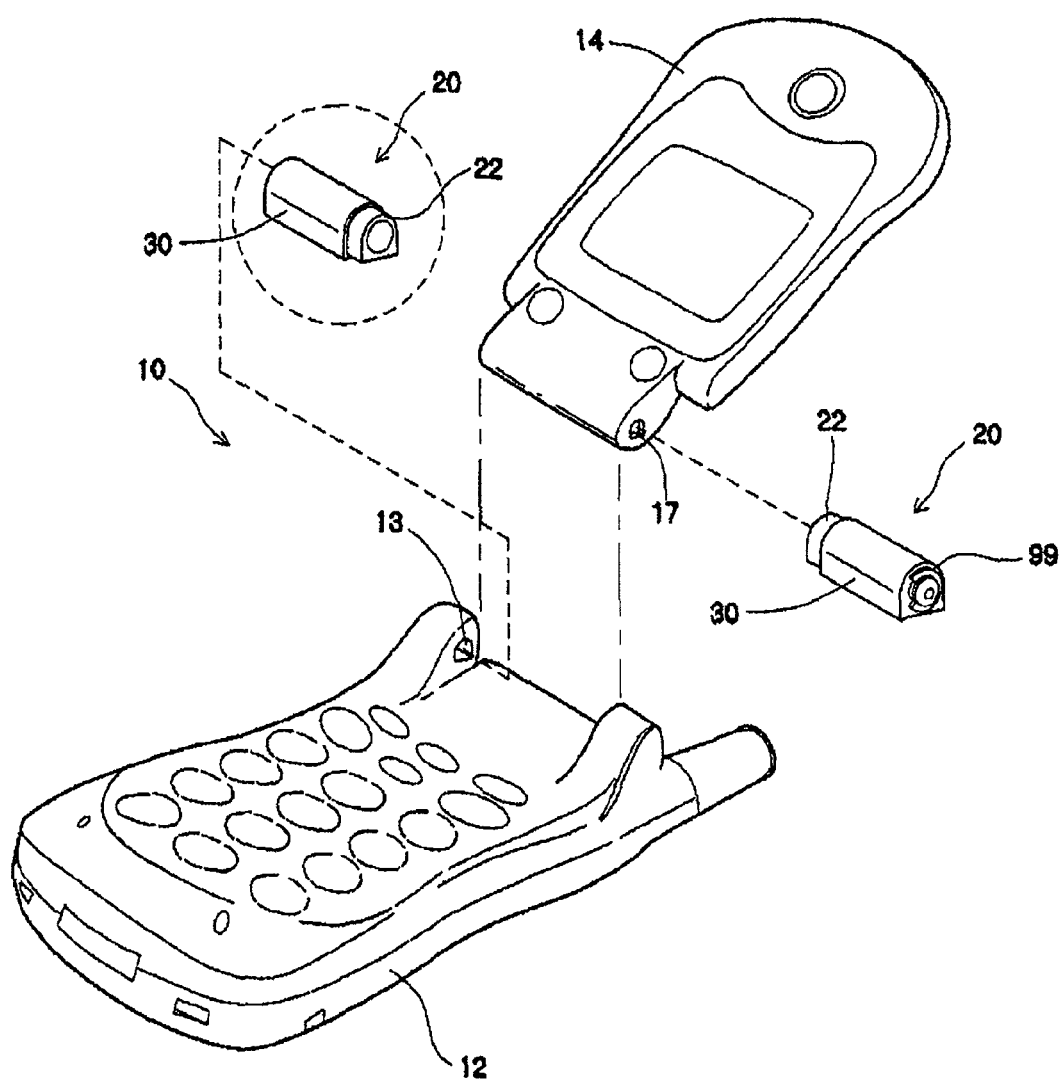
FIG. 1 is a perspective view of a folding-type radio telephone including a hinge device according to an embodiment of the present invention, wherein first and second case units and the hinge device are shown to be separated from one another and the hinge device is shown to be enlarged.

Referring to FIG. 1, a folding-type radio telephone 10 comprises a first case unit 12 provided with a keypad and a second case unit 14 provided with a liquid crystal display. Hinge devices 20 are mounted to both side surfaces which serve as coupling portions between the first case unit 12 and the second case unit 14. A housing member 30 of the hinge device 20 to be described below is inserted into a mounting hole 13 of the first case unit 12. A coupling portion 22 of the second connecting member 40 of the hinge device 20 to be described below is inserted into a coupling hole 17 of the second case unit 14. The mounting hole 13 is identical with the housing member 30 in view of their shapes, and is sized to allow the housing member 30 to be snugly fitted therein, so that the first case unit 12 and the housing member 30 may be rotated together. The coupling hole 17 is substantially the same as the coupling portion 22 of the hinge device 20 in view of theirs shapes, and is sized to allow the coupling portion 22 to be snugly fitted therein, so that the second case unit 14 and the coupling portion 22 may be rotated together.

Figure 2:
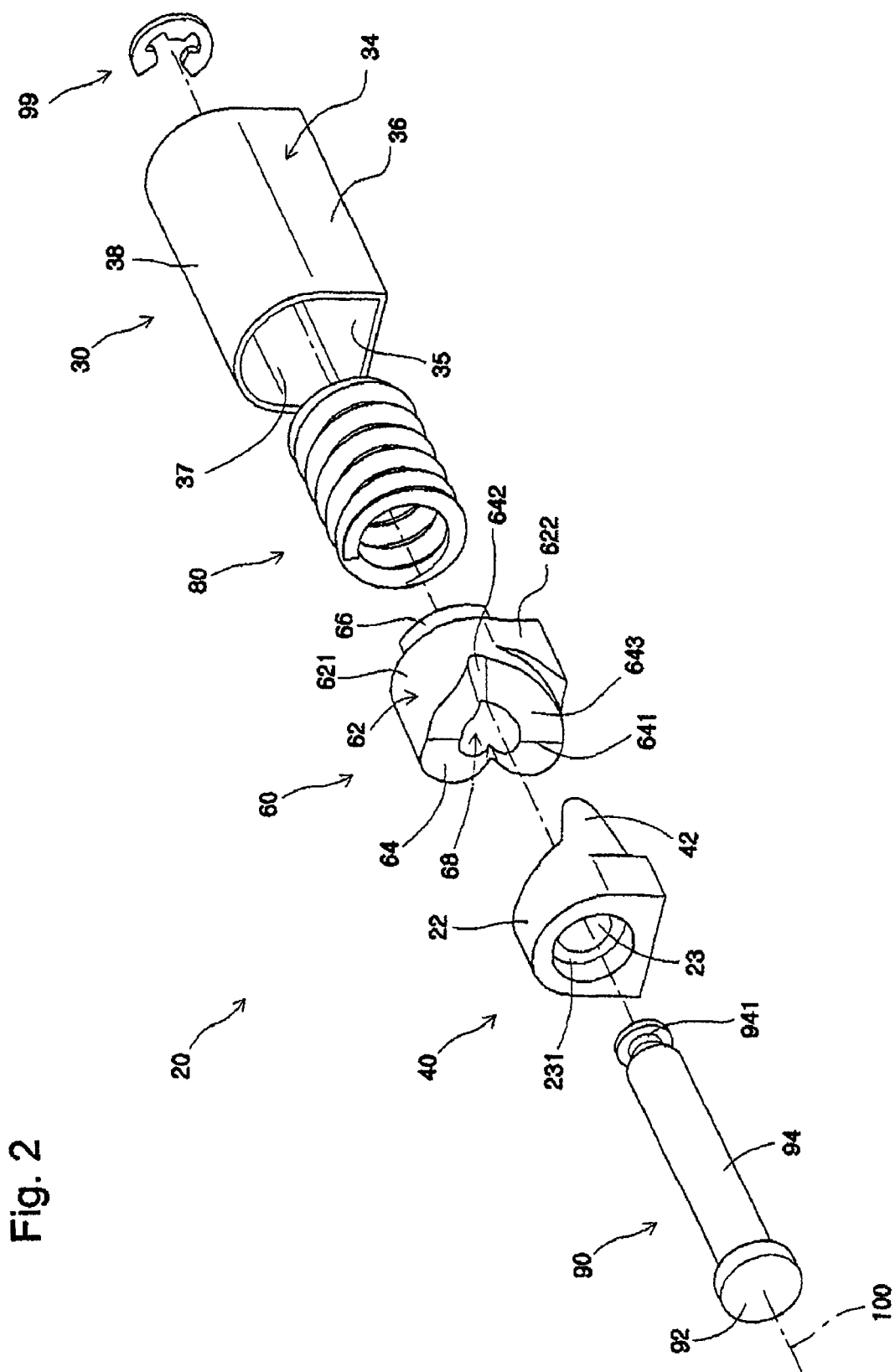
FIG. 2 is an exploded perspective view of the hinge device shown in FIG. 1.
Figure 3:
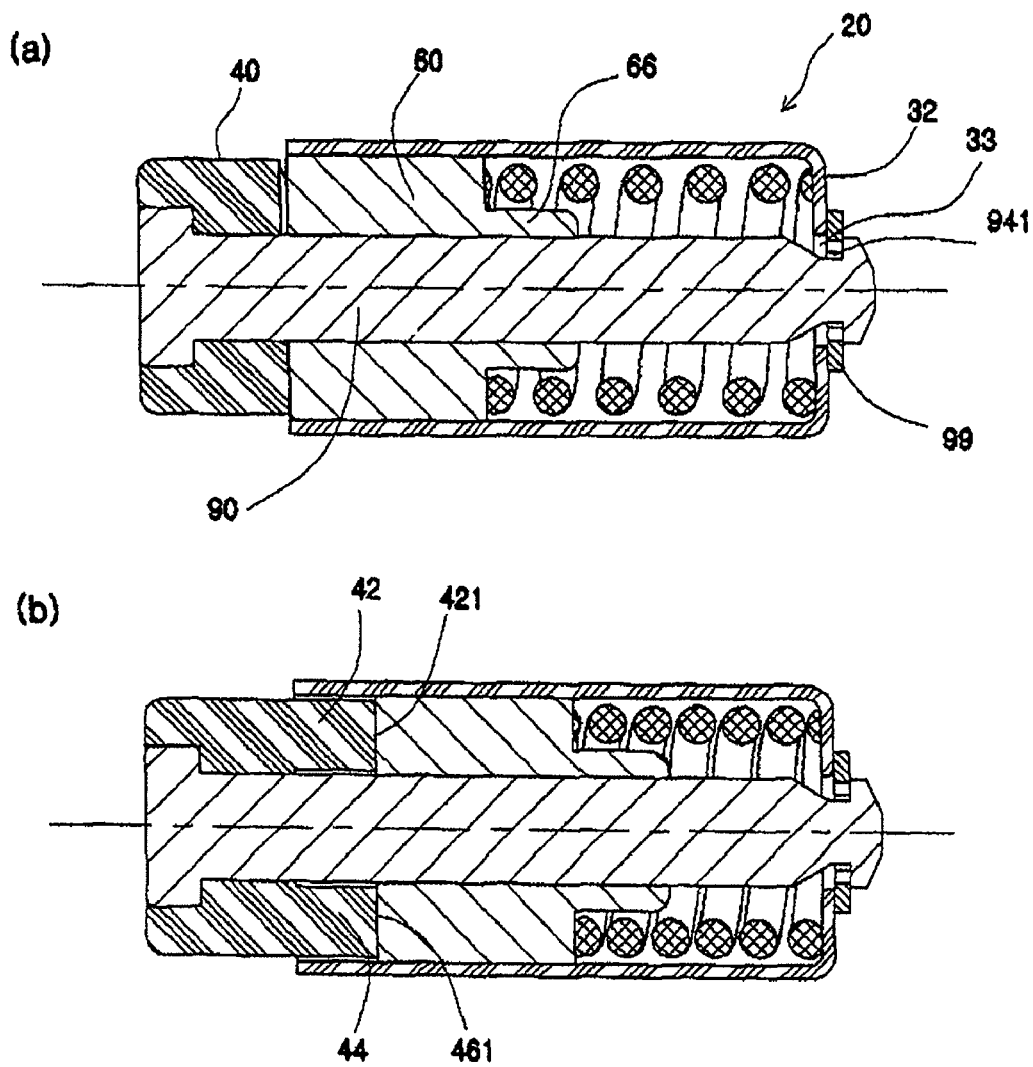
FIGS. 3 (a) and (b) are sectional views of the hinge device shown in FIG. 1.

Referring to FIGS. 1 to 3, the hinge device 20 includes the housing member 30, a first connecting member 60, a second connecting member 40, an elastic member 80 and a coupling member 90. The housing member 30 is formed into an elongated container. A longitudinal central line of the housing member 30 becomes a rotational axis 100 of the hinge device 20. The housing member 30 includes an end wall 32 formed at one end thereof and a side wall 34 formed to extend from the end wall 32. The shape of the end wall 32 is generally identical with that of an outer wall surface 62 of the first connecting member 60 to be described below. A side of the housing member 30 opposite to the end wall 32 is opened. A central portion of the end wall 32 is provided with a through-hole 33. An end of the coupling member 90 to be described below protrudes through the through-hole 33 such that the coupling member can be coupled with the housing member by means of an E-ring 99. The side wall 34 includes a first flat wall portion 35, second and third opposite flat wall portions 36 and 37 connected to the first flat wall portion 35, and a fourth semicircular wall portion 38 for connecting the second and third flat wall portions 36 and 37. The first, second and third flat wall portions 35, 36 and 37 function as a key for preventing the housing member 30 from being rotated when they are fitted and assembled into the first case unit 12 of the folding-type radio telephone 10. In addition, the first, second and third flat wall portions 35, 36 and 37 also serve to prevent the first connecting member 60 received in the housing member from being rotated, as will be described below. The housing member 30 may be made of metal (e.g., a brass plate) and manufactured through a deep drawing process. Alternatively, the housing member 30 may be formed through an injection molding process of a plastic resin material.

Figure 4:
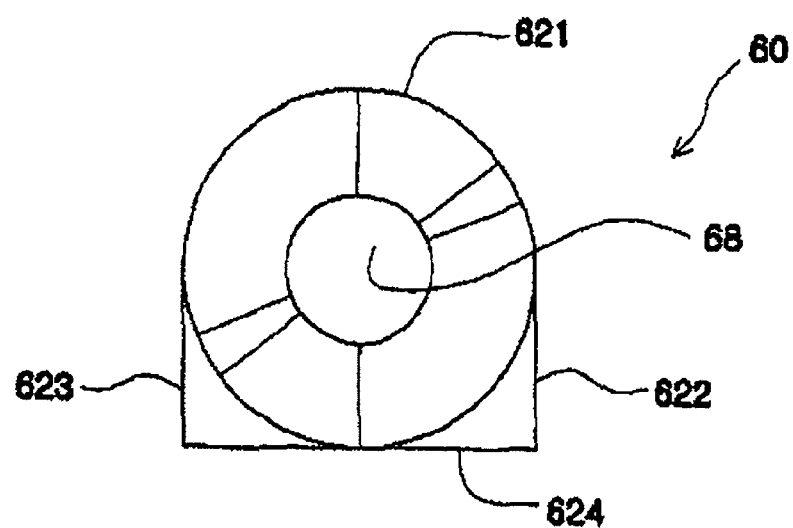
FIG. 4 is a front view of a first connecting member shown in FIG. 2.

Referring to FIGS. 2 to 4, the first connecting member 60 includes the outer wall surface 62, a cam surface 64 formed on a surface facing the second connecting member 40, and a cylindrical boss 66 formed to extend from a central portion of a side of the first connecting member opposite to the cam surface 64. The first connecting member 60 is provided with a through hole 68 which is bored through the first connecting member from the cam surface 64 to the boss 66 along the rotational axis 100. The coupling member 90 penetrates though the through-hole 68. Referring to FIGS. 2 to 4, the outer wall surface 62 has a circular-arc curved portion 621, first and second flat portions 622 and 623 extending tangentially from both circumferential ends of the curved portion 621, and a connection portion 624 for connecting the first and second flat portions 622 and 623, similar to the shape of the side wall 34 of the housing member 30. The curved portion 621 takes the shape of a circular-arc extending about 180 degrees in a circumferential direction about the rotational axis 100. The third connection portion 624 is a third flat portion 624 which connects with the first and second flat portions 622 and 623. A radial distance from the rotational axis 100 to the third flat portion 624 is substantially the same as that from the rotational axis 100 to the curved portion 621. The first, second and third flat portions 622, 623 and 624 interact with the second, third and first flat wall portions 36, 37 and 35 of the side wall 34 of the housing member 30, respectively, so that the outer wall surface 62 can be linearly moved but cannot be rotated within the housing member 30. The shape of the outer wall surface 62 can provide an effective area of the cam surface 64 enough to operate the hinge device 20 as well as provide a reduced size of the first connecting member 60, so that the size of the hinge device 20 in its entirety including the housing member 30 can be reduced. The first connecting member 60 is inserted through the open end of the housing member 30. At this time, the cam surface 64 faces two cam follower projections 42 and 46 of the second connecting member 40. The cam surface 64 has a peak section 641, a valley section 642 and an inclined section 643.

Referring to FIGS. 1 to 3, the second connecting member 40 has the coupling portion 22 and the two cam follower projections 42 and 46 extending from the coupling portion 22. The coupling portion 22 substantially takes the same shape as that of the outer wall surface 62 of the first connecting member 60. The second connecting member 40 is provided with a passage hole 23 bored through the central portion of the second connecting member 40 along the rotational axis 100. A coupling member 90 to be described below penetrates through the passage hole 23. An entrance side of the passage hole 23 functions as a receiving portion 231 which is enlarged to receive a head 92 of the coupling member 90 to be described below. The two cam follower projections 42 and 46 are provided at diametrically opposite positions about the rotational axis 100, respectively, on a rear side of the coupling portion 22 facing the first connecting member. Respective distal ends of the two cam follower projections 42 and 46 serve as cam followers 421 and 461 interacting with the cam surface 64 of the first connecting member 60. The second connecting member 40 is inserted through the open end of the housing member 30 in such a manner that the coupling portion 22 can protrude outward from the housing member 30 and the two cam follower projections 42 and 46 can be received in the housing member 30. The second connecting member 40 serving as a cam follower may be rotated about the rotational axis 100 with respect to the housing member 30 by means of the coupling member 90.

Referring to FIGS. 2 and 3, the elastic member 80 pushes the first connecting member 60 toward the second connecting member 40. The elastic member 80 may be a compression coil spring. A boss 66 of the first connecting member 60 is fitted into one side of the elastic member 80.

Referring to FIGS. 2 and 3, the coupling member 90 includes the head 92 and a cylindrical body 94 extending lengthwise from the head 92 along the rotational axis 100. An end portion of the cylindrical body 94 is provided with a ring-shaped coupling groove 941. The head 92 is received in the receiving portion 231 which is provided in the entrance side of the passage hole 23 of the second connecting member 40. The body 94 sequentially penetrates through the passage hole 23 of the second connecting member 40, the through-hole 68 of the first connecting member 60, and the interior of the elastic member 80, so that the end of the body 94 can protrude outward though the through-hole 33 provided in the end wall 32 of the housing member 30. At this time, the coupling groove 941 provided in the end portion of the body 94 also protrudes outward from the end wall 32 of the housing member 30, and a stop ring 99 called an E-ring is coupled with the coupling groove 941 to thereby couple the coupling member 90 with the housing member 30. The second connecting member 40 can be rotated about a longitudinal axis of the body 94 of the coupling member 90.

The first connecting member 60 and the second connecting member 40 are manufactured through an injection molding process of a plastic resin, and may be made of an engineering plastic resin. Furthermore, it is possible to manufacture the first connecting member 60 and the second connecting member 40 through a sintering process or a cold forging process of a metallic material.

Now, the operation of the hinge device 20 according to the aforementioned embodiment will be described with reference to FIGS. 2 to 4. As the second connecting member 40 is rotated about the rotational axis 100 with respect to the housing member 30, the two cam followers 421 and 461 of the second connecting member 40 interact with the cam surface 64 of the first connecting member 60, so that the second connecting member 40 can be linearly moved along the rotational axis 100. FIG. 3 (a) shows a state where the first connecting member 60 is positioned closest to the second connecting member 40, whereas FIG. 3 (b) show a state where the first connecting member 60 is positioned farthest from the second connecting member 40. At this time, the first connecting member 60 can be linearly moved along but cannot be rotated about the rotational axis 100 with respect to the housing member 30 due to the first, second and third flat portions 622, 623 and 624 of the first connecting member 60.

Figure 5:
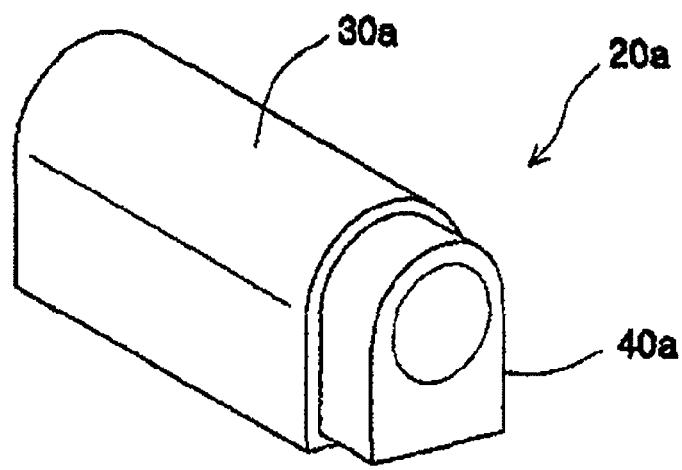
FIG. 5 is a view of a hinge device according to an embodiment of the present invention, wherein (a) is a perspective view of the hinge device and (b) is a front view of a first connecting member.
Figure 5:
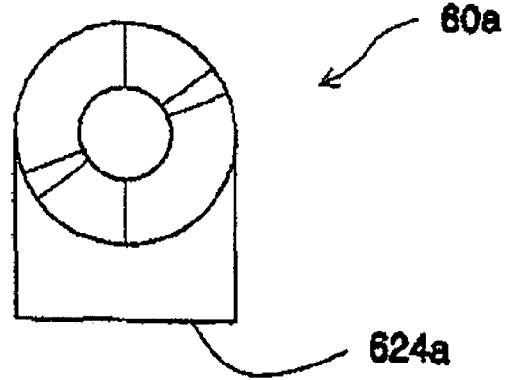

FIG. 5 (a) shows a hinge device 20a according to an embodiment of the present invention, and FIG. 5 (b) shows a first connecting member 60a used in the hinge device shown in FIG. 5 (a). Referring to FIG. 5, a third flat portion 624a of the first connecting member 60a is positioned farther than the third flat portion 624 shown in FIG. 4 from the rotational axis 100 (shown in FIG. 2). A housing member 30a and a second connecting member 40a have shapes that are substantially the same as that of the first connecting member 60a. Since the other configurations and operations are identical with those of the previous embodiment shown in FIG. 2, detailed descriptions thereof will be omitted herein.

Figure 6:
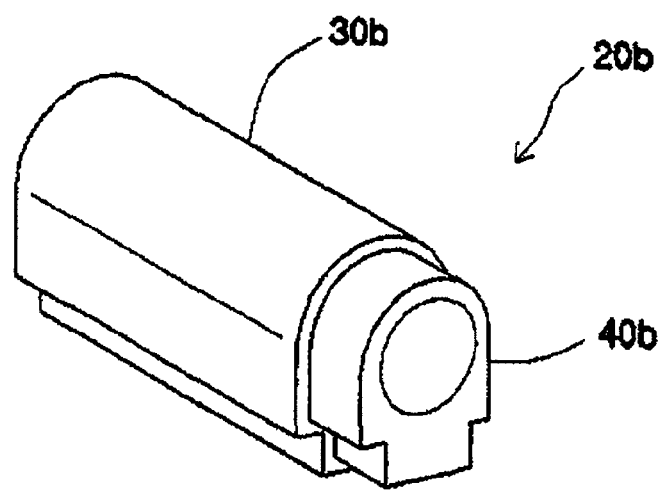
FIG. 6 is a view of a hinge device according to an embodiment of the present invention, wherein (a) is a perspective view of the hinge device and (b) is a front view of a first connecting member.
Figure 6:
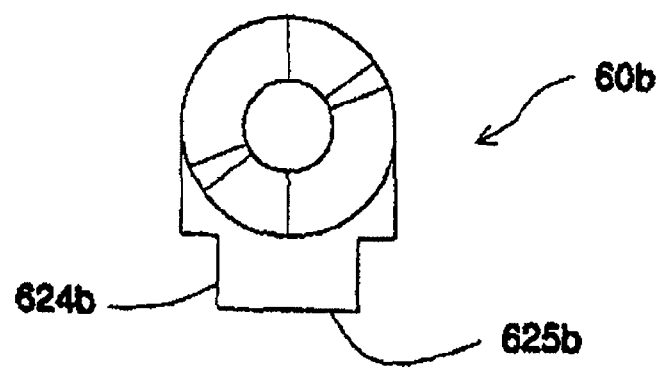

FIG. 6 (a) shows a hinge device 20b according to an embodiment of the present invention, and FIG. 6 (b) shows a first connecting member 60b used in the hinge device shown in FIG. 6 (a). Referring to FIG. 6, a connection portion 624b of the first connecting member 60b has a protrusion surface 625b which protrudes in a radial direction from the rotational axis 100 (shown in FIG. 2). A housing member 30b and a second connecting member 40b have shapes that are substantially the same as that of the first connecting member 60b. Since the other configurations and operations are identical with those of the previous embodiment shown in FIG. 2, detailed descriptions thereof will be omitted herein.

Figure 7:
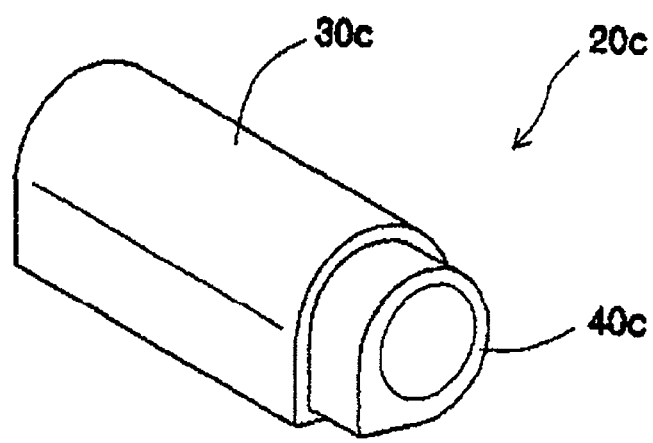
FIG. 7 is a view of a hinge device according to an embodiment of the present invention, wherein (a) is a perspective view of the hinge device and (b) is a front view of a first connecting member.
Figure 7:
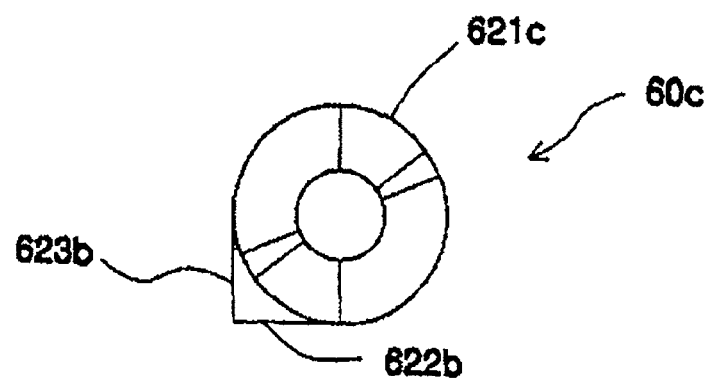

FIG. 7 (a) shows a hinge device 20c according to an embodiment of the present invention, and FIG. 7 (b) shows a first connecting member 60c used in the hinge device shown in FIG. 7 (a). Referring to FIG. 7, a curved portion 621c of the first connecting member 60c extends approximately 270 degrees in a circumferential direction, and connects with first and second flat portions 622b and 623b. A housing member 30c and a second connecting member 40c have shapes that are substantially the same as that of the first connecting member 60c. Since the other configurations and operations are identical with those of the previous embodiment shown in FIG. 2, detailed descriptions thereof will be omitted herein.

Although it has been described in the aforementioned embodiments that the hinge device is mounted to a radio telephone, the present invention is not limited thereto. It can be understood by those skilled in the art that the hinge according to embodiments of the present invention can be applied to an apparatus provided with two units that can be folded or unfolded with respect to each other about a single axis.

Although various embodiments of the present invention has been illustrated and described, the present invention is not limited thereto. It will be understood by those skilled in the art that various modifications and changes can be made thereto without departing from the scope and spirit of the present invention and such various modifications and changes will also be included into the present invention.

What is claimed is:

1. An electronic handheld device comprising:
   a first panel;
   a second panel rotatable relative to the first panel about an axis such that the first and second panels are folded or unfolded with respect to each other;
   a hinge housing engaged with the first panel;
   a first hinge member received in the hinge housing and linearly movable relative to the hinge housing along the axis;
   a second hinge member engaged with the second panel and rotatable relative to the first hinge member about the axis, wherein one of the first and second hinge members comprises a cam having a cam surface, wherein the other comprises a cam follower in contact with the cam surface and configured to move along a path on the cam surface; and
   a resilient member configured to keep the cam follower and the cam surface in contact with each other,
   wherein the hinge housing comprises an inner wall defining a hole generally extending along the axis, wherein the first hinge member is configured to linearly move within the hole,
   wherein the inner wall comprises a curved surface and a key, wherein at least part of the curved surface is a circular arc having a first radius from the axis when viewed along the axis, wherein the key is configured to hinder the first hinge member from rotating relative to the hinge housing, wherein the key is located outside an imaginary circle, wherein a portion of the circumference line of the imaginary circle overlaps the circular arc.

2. The device of claim 1, wherein the key comprises a first surface and a second surface substantially parallel to the first surface.

3. The device of claim 1, wherein the key comprises a first surface and a second surface substantially non-parallel to the first surface.

4. The device of claim 1, wherein the key comprises a first surface and a second surface substantially perpendicular to the first surface.

5. The device of claim 1, wherein the key comprises a first surface and a second surface, wherein the curved surface interconnects the first and second surfaces without a substantially intervening surface between the curved surface and each of the first and second surfaces.

6. The device of claim 1, wherein the key comprises a key surface that is substantially flat.

7. The device of claim 1, wherein the key comprises a key surface extending along a tangential line of the imaginary circle when viewed along the axis.

8. The device of claim 1, wherein the first hinge member comprises a curved outer surface having a second radius from the axis that is sized such that the first hinge member slidably fits into the hole.

9. The device of claim 1, wherein the first hinge member comprises a curved outer surface having a second radius from the axis, wherein the second hinge member comprises a curved outer surface having a third radius from the axis that is substantially same with the second radius.

10. The device of claim 1, wherein the electronic handheld device comprises one selected from the group consisting of a mobile phone, a text messaging device, a wireless data communication device, a PDA, a GPS navigator, an electronic game device, a notebook computer and a handheld computer.

11. The device of claim 1, wherein the electronic handheld device comprises a display and a keypad, wherein the first panel comprises one of the display and the keypad, wherein the second panel comprises the other of the display and the keypad.

12. An electronic handheld device comprising:
a first panel;
a second panel rotatable relative to the first panel about an axis such that the first and second panels are folded or unfolded with respect to each other;
a first hinge member engaged with the first panel and linearly movable relative to the first panel along the axis;
a second hinge member engaged with the second panel and rotatable relative to the first hinge member about the axis, wherein one of the first and second hinge members comprises a cam having a cam surface, wherein the other comprises a cam follower in contact with the cam surface and configured to move along a path on the cam surface; and
a resilient member configured to keep the cam follower and the cam surface in contact with each other,
wherein the first panel comprises an inner wall defining a hole generally extending along the axis, wherein the first hinge member is configured to linearly move within the hole,
wherein the inner wall comprises a curved surface and a key, wherein at least part of the curved surface is a circular arc having a first radius from the axis when viewed along the axis, wherein the key is configured to hinder the first hinge member from rotating relative to the hinge housing, wherein the key is located outside an imaginary circle, wherein a portion of the circumference line of the imaginary circle overlaps the circular arc.

13. The device of claim 12, wherein the first panel comprises a main body and a hinge housing engaged with the main body, wherein the hinge housing comprises the inner wall.

14. An electronic handheld device comprising:
a first panel;
a second panel rotatable relative to the first panel about an axis such that the first and second panels are folded or unfolded with respect to each other;
a first hinge member engaged with the first panel and linearly movable relative to the first panel along the axis;
a second hinge member engaged with the second panel and rotatable relative to the first hinge member about the axis, wherein one of the first and second hinge members comprises a cam having a cam surface, wherein the other comprises a cam follower in contact with the cam surface and configured to move along a path on the cam surface; and
a resilient member configured to keep the cam follower and the cam surface in contact with each other,
wherein the first panel comprises a hole generally extending along the axis, wherein the first hinge member is configured to linearly move within the hole,
wherein the first hinge member comprises an outer wall which comprises a curved surface and a key, wherein at least part of the curved surface is a circular arc having a second radius from the axis when viewed along the axis, wherein the key is configured to hinder the first hinge member from rotating relative to the hinge housing, wherein the key is located outside an imaginary circle, wherein a portion of the circumference line of the imaginary circle overlaps the circular arc.

15. The device of claim 14, wherein the key comprises a first surface and a second surface substantially parallel to the first surface.

16. The device of claim 14, wherein the key comprises a first surface and a second surface substantially perpendicular to the first surface.

17. The device of claim 14, wherein the key comprises a key surface that is substantially flat.

18. The device of claim 14, wherein the key comprises a key surface extending along a tangential line of the imaginary circle when viewed along the axis.

19. The device of claim 14, wherein the first panel comprises a main body and a hinge housing engaged with the main body and defining the hole.

20. The device of claim 14, wherein the first panel comprises an inner wall defining the hole, wherein the inner wall comprises an inner curved surface having a first radius from the axis which is sized such that the first hinge member slidably fits into the hole.

21. The device of claim 14, wherein the second hinge member comprises a curved outer surface having a third radius from the axis that is substantially same with the second radius.

* * * * *